United States Patent
Chew et al.

(10) Patent No.: US 9,621,550 B2
(45) Date of Patent: Apr. 11, 2017

(54) METHOD FOR PROVIDING A SECURE SERVICE

(71) Applicant: INSIDE SECURE, Meyreuil (FR)

(72) Inventors: Gary Chew, Aix-en-Provence (FR); Georges Gagnerot, Marseilles (FR); Jean-François Grezes, Marseilles (FR)

(73) Assignee: Inside Secure, Meyreuil (FR)

( * ) Notice: Subject to any disclaimer, the term of this patent is extended or adjusted under 35 U.S.C. 154(b) by 0 days.

(21) Appl. No.: 14/431,153

(22) PCT Filed: Sep. 25, 2013

(86) PCT No.: PCT/FR2013/052255
§ 371 (c)(1),
(2) Date: Mar. 25, 2015

(87) PCT Pub. No.: WO2014/064353
PCT Pub. Date: May 1, 2014

(65) Prior Publication Data
US 2015/0256537 A1    Sep. 10, 2015

(30) Foreign Application Priority Data
Oct. 26, 2012    (FR) ..................................... 12 60227

(51) Int. Cl.
*G06F 15/16*    (2006.01)
*H04L 29/06*    (2006.01)
(Continued)

(52) U.S. Cl.
CPC ............ *H04L 63/0869* (2013.01); *G06F 8/61* (2013.01); *G06F 21/30* (2013.01); *H04L 63/04* (2013.01); *H04W 12/06* (2013.01); *H04W 12/08* (2013.01)

(58) Field of Classification Search
CPC ........ H04L 63/0869; H04L 63/04; G06F 8/61
(Continued)

(56) References Cited

U.S. PATENT DOCUMENTS

2009/0205036 A1* 8/2009 Slaton .................. H04L 63/083
726/9
2012/0144202 A1* 6/2012 Counterman ......... G06F 21/335
713/176

FOREIGN PATENT DOCUMENTS

WO    2009/007653 A1    1/2009

OTHER PUBLICATIONS

Dec. 4, 2013 Intenational Search Report issued in International Patent Application No. PCT/FR2013/052255.
(Continued)

*Primary Examiner* — Evans Desrosiers
(74) *Attorney, Agent, or Firm* — Brake Hughes Bellermann LLP (57) ABSTRACT

In a general aspect, a method can include: installing in a non-secure device a customized module for managing communications with a secure element, transmitting to the secure element first authentication data for authenticating the customized module, the customized module generating and transmitting to the secure element second authentication data for authenticating the customized module, if the secure element determines that the first and second authentication data are consistent with each other, establishing a secure communication link between the customized module and the secure element, by using the first or second authentication data, the non-secure device transmitting a command to the secure element, for an application installed in the secure element, and the secure element executing the command only if the command is sent via the secure communication link.

26 Claims, 5 Drawing Sheets

(51) Int. Cl.
  *G06F 21/30*   (2013.01)
  *H04W 12/06*   (2009.01)
  *G06F 9/445*   (2006.01)
  *H04W 12/08*   (2009.01)

(58) Field of Classification Search
  USPC ......... 713/168–174, 182–186, 202; 709/206,
         709/225, 229, 249, 389; 726/2–8
  See application file for complete search history.

(56) References Cited

OTHER PUBLICATIONS

Jan. 22, 2015 International Preliminary Report on Patentability issued in International Patent Application No. PCT/FR2013/052255.

* cited by examiner

METHOD FOR PROVIDING A SECURE SERVICE

The present invention relates to the performance of secure transactions or the provision of secure services, through a secure element such as a secure processor. The secure element may be connected or embedded in a host device, such as a mobile telephone or equivalent, or a computer. The secure element may comprise a secure processor such as a SIM (Subscriber Identity Module) card, a micro-SD (micro Secure Digital) card, a UICC ("Universal Integrated Circuit Card") module, or more generally an integrated circuit card compliant in particular with the ISO 7816 standard. The secure element may also merely consist of a secure environment implemented by a processor, such as the Trusted Execution Environment compliant in particular with the GlobalPlatform standard.

Conducting a transaction or providing a service using a secure element generally requires installing in the host device an application which involves the secure element when a secure operation must be performed.

However, as the host device is not secure, an application installed in the host device can be designed to start attacks against the secure element, aiming in particular to discover secret information stored or handled by the secure element. Such attacks can also aim to perform transactions without the holder of the secure element knowing.

To remove these risks, it appears desirable to be able to ensure that an application attempting to access the secure element is authorized to perform such an access. Once an application can access the secure element, it is also desirable to ensure that other applications do not use the access authorization allocated to the application.

For this purpose, the JSR 177 standard (Java Specification Request) has been developed to propose a standardized communication interface between a mobile telephone and a secure processor in order to secure the exchange and the storage of data such as the data exchanged during a transaction, and to identify and authenticate the user during the exchange of data with third parties. The standard JSR 177 comprises an access control mechanism enabling an application susceptible of being authenticated to access information stored in the secure element. Upon receipt of an access request sent by the application, the access control mechanism implemented by the operating system of the host device accesses access control data stored by the secure element, and authenticates the application using such access control data.

JSR 177 thus has the disadvantage of leaving the (non-secure) operating system of the host device with the access control function. Therefore, there is a risk of the operating system being fraudulently modified to deactivate or modify the access control mechanism.

Furthermore, each type of host device has its own operating system which implements its own access control mechanism. The result is that the access control mechanism must be adapted to many different operating systems. Furthermore, every time this mechanism is modified, each operating system implementing this mechanism must also be modified.

It is thus desirable to improve the robustness of access control mechanisms for controlling access to a secure element by applications installed in a host device. It is also desirable not to have to modify the operating systems susceptible of equipping existing host devices to implement such a mechanism.

Some embodiments relate to a method for executing a command by a secure element from a non-secure device connected to the secure element, the method comprising steps of: installing in the non-secure device a customized module for managing communications with the secure element, transmitting to the secure element first authentication data for authenticating the customized module, so as to ensure the confidentiality of the transmitted data, the customized module generating and transmitting to the secure element second authentication data for authenticating the customized module, if the secure element determines that the first and second authentication data are consistent with each other, establishing a secure communication link between the customized module and the secure element, by using the first or second authentication data, the non-secure device transmitting a command to the secure element, and the secure element executing the command only if the command is sent via the secure communication link.

According to one embodiment, the first authentication data comprise a first signature of the executable code of the customized module, the method comprising steps of: the customized module calculating a second signature of the executable code of the customized module, and the customized module calculating the second authentication data by applying a cryptographic function to the second signature.

According to one embodiment, the command is executed by the secure element only if it is authorized for a destination application installed in the secure element, and/or for an application issuing the command, installed in the non-secure device, according to an access control list stored by the secure element.

According to one embodiment, each application installed in the non-secure device, susceptible of communicating with the secure element, comprises the customized module.

According to one embodiment, the method comprises steps of transmitting and installing in the non-secure device a new customized module for managing communications with the secure element or new customization data for customizing the customized module, and of transmitting to the secure element new first authentication data for authenticating the new customized module or the customized module associated with the new customization data, these steps being executed either periodically, or in case of error encountered by the secure element when establishing the secure communication link or when processing a command issued by an application of the non-secure device.

According to one embodiment, the customized module is generated by a trusted server, and the first authentication data for authenticating the customized module are transmitted by the trusted server to the secure element via a secure link established between the secure element and an address of the trusted server.

According to one embodiment, the address of the server is provided to the secure element during a process of customizing the secure element, performed using identification data for identifying a user.

According to one embodiment, the transmission of the first authentication data between the trusted server and the secure element is preceded by mutual authentication steps between the trusted server and the secure element.

According to one embodiment, a secure communication link is established exclusively for a single application installed in the non-secure device, another secure communication link being established for another application installed in the non-secure device.

According to one embodiment, the secure communication link is established for a limited duration or to transmit a limited number of commands.

Some embodiments also relate to a system comprising a non-secure device, a secure element connected to the non-secure device, and a trusted server, the non-secure device comprising communication circuits for communicating with the trusted server, the system being configured to execute the method described above.

According to one embodiment, the non-secure device is a processor of a computer or of a portable device comprising the communication circuits to communicate with a remote server, and the secure element is a secure processor or a secure environment implemented in a processor.

Some embodiments also relate to a secure element comprising a connection interface to connect to a non-secure device, the secure element being configured to: confidentially receive first authentication data for authenticating a customized module, sent by a trusted server, receive second authentication data for authenticating the customized module, sent by the non-secure device, if the first and second authentication data are consistent with each other, establish a secure communication link with the customized module installed in the non-secure device, by using the first or second authentication data, receive a command, and execute the command only if the command is sent via the secure communication link.

According to one embodiment, the secure element is configured to execute the command only if it is authorized for a destination application of the command, installed in the secure element, and/or an application issuing the command, installed in the non-secure device, according to an access control list stored by the secure element.

According to one embodiment, the secure element is configured to issue a command for installing a new customized module for managing communications in the non-secure device connected to the secure element, and receive new first authentication data for authenticating the new customized module, in case of error encountered when establishing the secure communication link or when processing a command received.

According to one embodiment, the secure element is configured to receive the first authentication data for authenticating the customized module sent from a trusted server via a secure link established with an address of the trusted server, following a mutual authentication with the trusted server.

According to one embodiment, the secure element is configured to keep each secure communication link active for a limited duration.

Some examples of embodiments of the present invention will be described below in relation with, but not limited to, the accompanying figures, in which.

Figure 1:
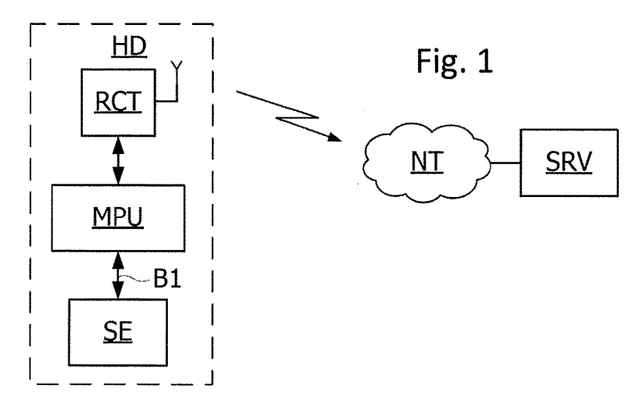
FIG. 1 schematically represents a system which can implement an access control method, according to one embodiment.

FIG. 1 represents a system comprising a host device MPU connected to a secure element SE, the device MPU being able to connect to remote servers. The host device MPU and the secure element SE can be integrated into a portable device HD such as a mobile telephone, or a desktop computer. The device MPU may be a processor of the device HD, for example the main processor or the processor in charge of managing the communications of the device with one or more wireless and/or hard-wire communication networks NT (for example GSM, 3G, LTE, WIFI). For this purpose, the processor MPU is connected to communication circuits RCT. The device HD can connect to the server SRV by means of one or more networks NT. The device HD or the element SE may also comprise a near field communication device (NFC) (not represented) to conduct near field communication transactions.

The secure element SE may comprise a secure processor, such as a SIM card (Subscriber Identity module), a micro-SD (micro Secure Digital) card, a UICC module, or more generally a secure integrated circuit. The element SE is connected to the processor MPU via a link B1 which can be of ISO 7816, SWP (Single Wire Protocol) or I2C (Inter Integrated Circuit) type.

For the implementation of the access control method, according to one embodiment, the device MPU can connect to a trusted server SRV which may be remote.

Figure 2:
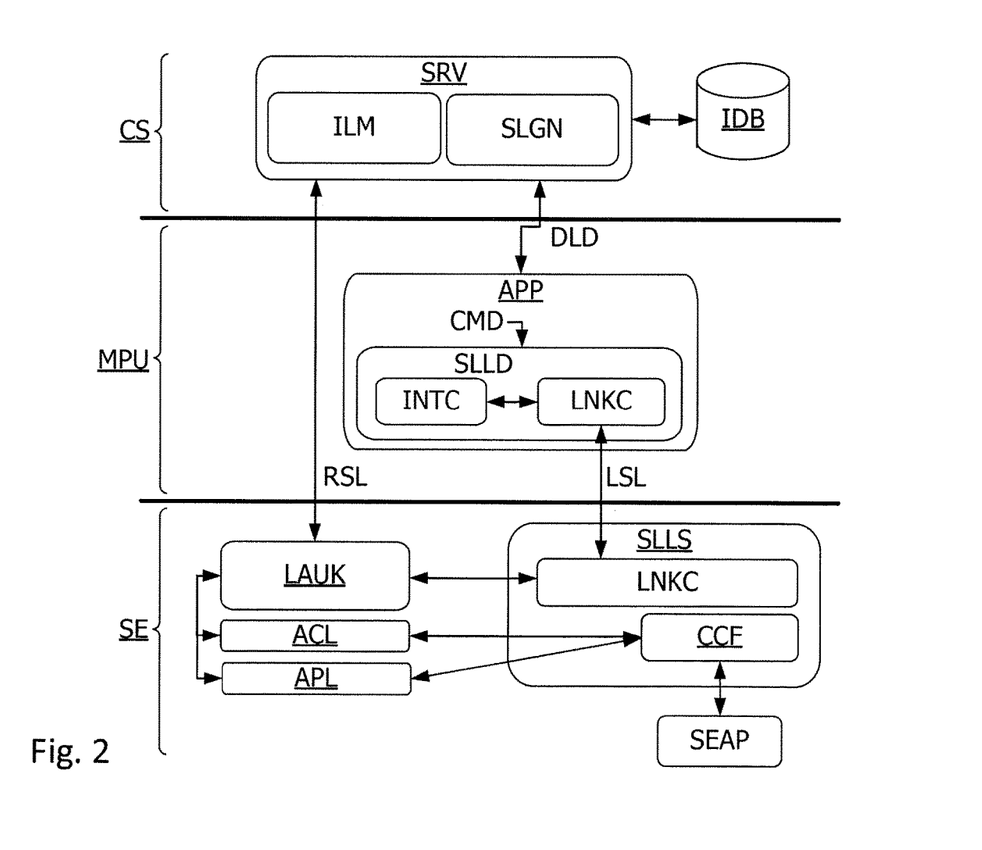
FIG. 2 is a functional diagram of the system, according to one embodiment, FIGS. 3 to 5 schematically represent sequences of steps of the access control method, according to some embodiments.

FIG. 2 is a functional diagram of the system in FIG. 1. On FIG. 2, the server SRV situated in a remote place CS ensures functions for establishing SLGN and for managing the integrity ILM of a secure link with the device MPU, and of a secure link with the element SE.

The device MPU comprises an operating system and one or more installed applications APP. Each application APP is known by the server SRV. Each application APP comprises a management module SLLD for managing a secure link SLS established with the element SE. The module SLLD comprises a function LAUT for establishing the secure link SLS with the element SE, and an integrity calculation function INTC.

The element SE comprises a management module SLLS for managing the secure link SLS, an authentication and integrity control function, an application data table APL, and an access control list ACL. The module SLLS comprises an interface module CCF for interfacing with applications or applets SEAP installed in the element SE, and a control module LNKC for controlling the secure links SLS established with the applications APP installed in the device MPU.

The table APL contains the identifiers of applications APP installed in the device MPU, each of these identifiers being able to be associated with authentication data (public key, certificate, signature of the executable code). The list ACL contains the identifiers of applications APP installed in the device MPU, each of these identifiers being associated with one or more identifiers of applications SEAP installed in the element SE, and with a list of commands intended for the application SEAP, authorized or prohibited for the application APP. In one alternative, the list ACL may comprise identifiers of prohibited applications.

The server SRV manages the content of a database IDB storing information concerning secure elements SE susceptible of connecting to the server SRV, like public keys and certificates (such as those of the module SLLS installed in the element SE), as well as a list of applications SEAP installed in each secure element. The database IDB also stores customization data (public keys, certificates) relating to applications (APP) installed in host devices (MPU) susceptible of communicating with the server SRV. The database IDB also stores the existence of peering links between the applications APP and the secure elements SE connected to the devices MPU in which the applications are installed. The database IDB also stores for each application APP a list ACL containing the identifiers of applications SEAP installed in the elements SE, with which the application APP is authorized to communicate, and for each application SEAP identifier, a list of commands authorized for the application APP.

Figure 3:
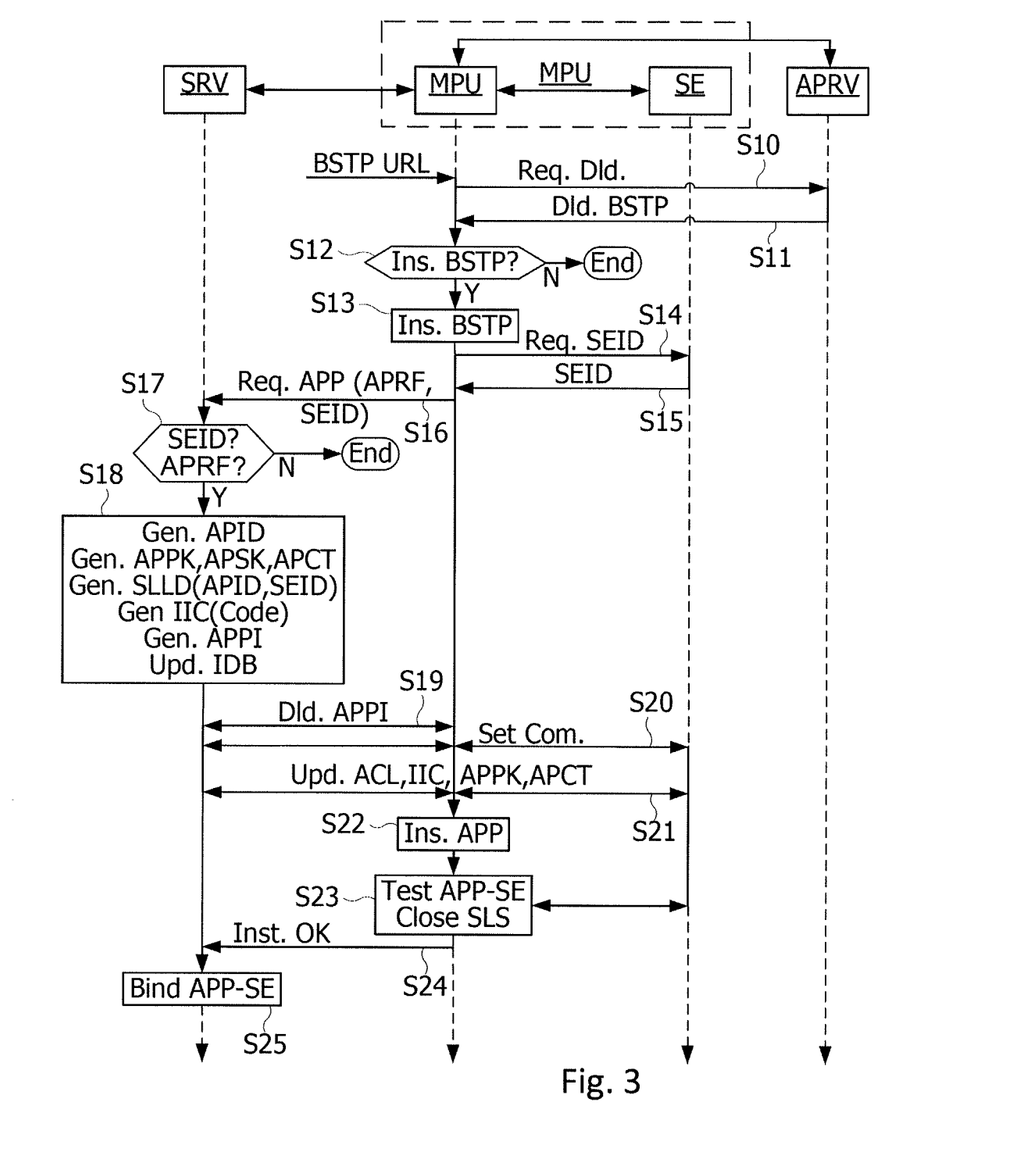

FIG. 3 represents a procedure for initializing and configuring the host device MPU and the secure element SE. This procedure comprises steps S10 to S25. These steps are for example triggered by an external event to install an application APP in the device MPU, the application APP being capable of functioning with one or more applications SEAP installed in the element SE. This external event can for example be an action by the user of the device MPU who wishes to install the application APP, or a signal from the server SRV and indicating that the application APP can be installed. This event comes with an address for downloading an installation program BSTP for installing the application APP, that is transmitted to the device MPU. The downloading address may correspond to that of the server SRV or an associated server APRV. In step S10, the device MPU accesses the URL address received and requests the downloading of the program BSTP. This request is for example sent by a Web browser installed in the device MPU, which transmits it to the server APRV with information concerning the device HD and in particular relating to the operating system OS of the device MPU and to the element SE. In response to this message, the server APRV transmits, in step S11, a message containing an installation program BSTP. Upon receiving this message, the device MPU executes step S13. Beforehand, the device MPU may ask the user for authorization to install the program BSTP thus received (step S12). If the user does not authorize the installation of the program received, the execution of steps S10 to S25 ends. It shall be noted that step S12 can be carried out before step S10.

In step S13, the program BSTP is installed and activated, and a communication link is established by the device MPU with the element SE. In the next step S14, the program BSTP asks the element SE for an identifier SEID. In step S15, the element SE transmits to the program BSTP the requested information which may comprise data relating to the status of the element SE. In step S16, the program BSTP transmits to the server SRV a request from the application APP to be installed, this request containing a reference APRF of the application APP, the identifier SEID, and possibly the status data received from the element SE. In step S17, the server SRV checks the existence of the identifier SEID and of the application APP corresponding to the reference APRF in the database IDB. If this information is not included in the database IDB, steps S18 to S25 are not executed. Otherwise, the server SRV generates specific data of the application APP comprising a unique application identifier APID, and a pair of asymmetric encryption keys APPK, APSK and/or a symmetric encryption key for the application APP, these keys possibly being associated with a certificate APCT. This application data is injected into the code of the module SLLD of the application APP, with the data (SEID) relating to the element SE transmitted in step S16. An initial signature IIC of the application APP thus generated (or only of the module SLLD) can then be calculated by the server SRV. Then, the server SRV generates an installation program APPI for installing the application APP including the module SLLD previously generated. The server SRV then proceeds with the update of the database IDB by introducing therein the data generated (APID, APSK, APPK, APCT) in association with the identifier SEID.

In step S19, the server SRV transmits the installation program APPI for installing the application APP thus generated, in response to the message transmitted in step S16. In step S20, which can be performed in parallel with step S19, the program BSTP establishes a secure communication link RSD (FIG. 2) between the server and the element SE. The secure link RSD can be established following a mutual authentication of the server SRV and the element SE, for example using a public key known by the server SRV and corresponding to a private key stored by the element SE, and using a public key known by the element SE and corresponding to a private key stored by the server SRV. The role as communication relay between the server and the element SE is then performed by the program BSTP executed by the device MPU. The function LAUT of the element SE which is involved in this authentication procedure uses for this purpose information about the server SRV stored by the element SE, and loaded when initializing and customizing the element SE with identification data identifying the holder of the element SE. Reciprocally, the server SRV uses information read in the database IDB concerning the element SE, and loaded into this base when initializing and customizing the element SE. The authentication procedure may for example comply with the one specified by the GlobalPlatform standard. If the authentication procedure fails, steps S21 to S25 are not executed. Otherwise, the link RSL has been established (the authentication procedure was successful). Steps S21 to S25 are then executed. The server SRV controls in step S21 the update of the access control list ACL and of the table APL stored by the element SE by using the secure link RSL. This update which is performed by the function LAUT, enables the identifier APID of the application APP and the identifiers AID of applications SEAP installed in the element SE, associated with lists CDUL of commands CDU authorized and/or non-authorized for the application APP, to be introduced into the list ACL. The table APL is updated by introducing therein the specific authentication data relating to the customized application APP, i.e. in particular the identifier APID of the application APP, the symmetric encryption secret key and/or the asymmetric encryption public key APPK of the application APP, possibly the associated certificate APCT, and the signature IIC of the executable code of the customized application APP. It shall be noted that the data transmitted via the link RSL are encrypted so as to ensure the confidentiality of the data it transmits, so that the device MPU cannot access such data. Such data may also be signed so as to protect their integrity.

In step S22, the program BSTP launches the execution of the installation program APPI received. The program BSTP may render the installation of the application APP dependent on the user's authorization. If the user does not authorize this installation, steps S22 to S25 are not executed. In step S23, the program BSTP activates a test function for testing the application APP thus installed. This test function starts an exchange with the element SE to perform a mutual authentication and thus establish a secure communication SLS. Steps S24 and S25 are executed only if this test is successful. In step S24, the program BSTP transmits a message to the server SRV indicating that the installation of the application APP is successful and that the application is peered with the element SE. In step S25, the server SRV receives this message and validates in the database IDB the existence of the peering link between the application APP thus installed in the device MPU and the element SE. Steps S18 to S25 are executed upon each installation or update of an application APP.

It shall be noted that new applications SEAP may be installed in the element SE in a manner known per se, for example in accordance with Global Platform, independently from the installation of applications in the device MPU. Furthermore, the element SE is configured to reject commands sent by an application APP installed in the device MPU, which would not be peered with the element SE, according to the list ACL. In this way, if a peered application is replaced with another application or if an application does not possess any module SLLD, no communication can occur between the element SE and the application if an authentication is required with this application in the list ACL. The applications installed in the device MPU cannot therefore communicate with the element SE without going through their module SLLD, the customized application with its module SLLD being peered with the element SE, if the list ACL of the element SE requires the application to be authenticated by the element SE.

Figure 4:
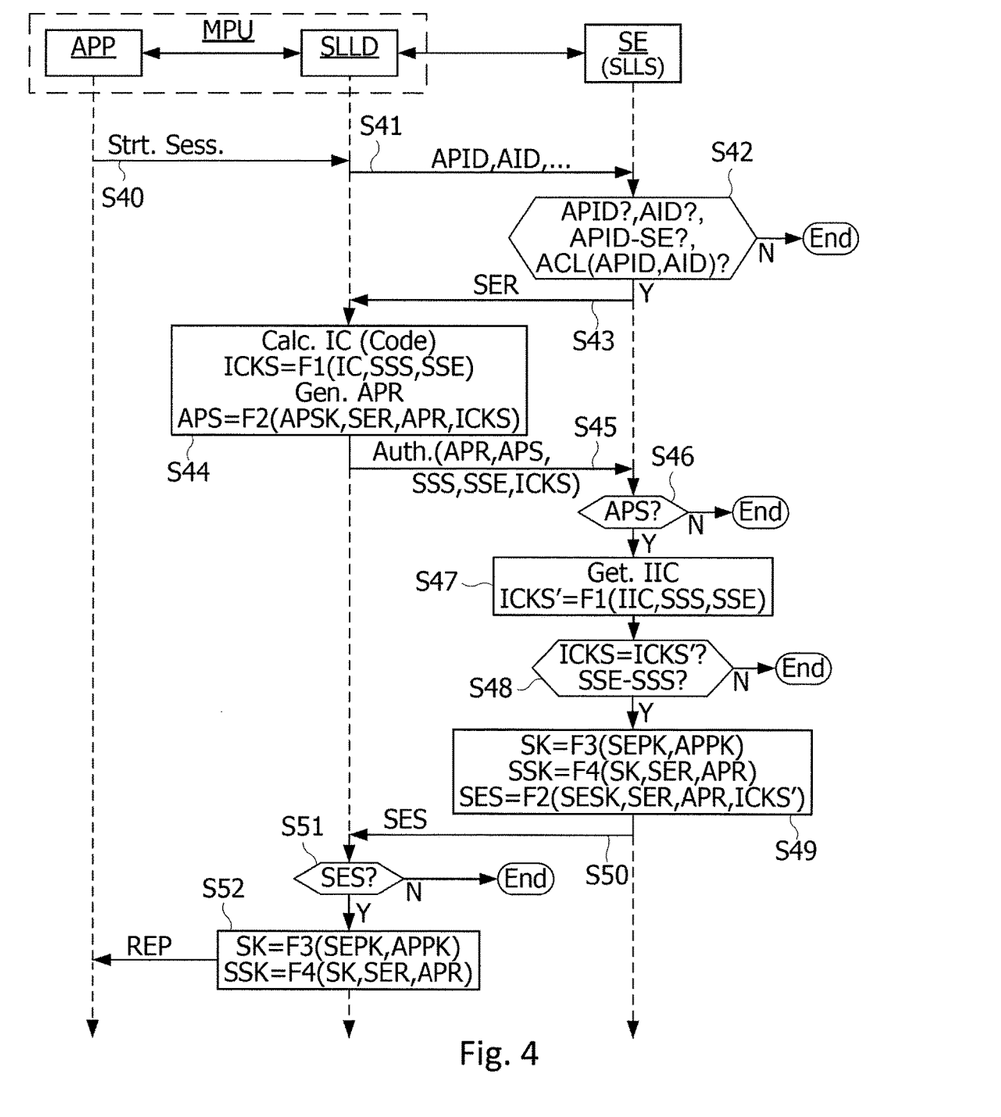

FIG. 4 represents steps of establishing a secure link LSL between a customized application APP installed in the device MPU and the element SE. This procedure comprises steps S40 to S52. In step S40, the application APP sends a message for requesting the activation of a session, for example via the command APDU (Application Protocol Data Unit) SELECT AID. This message is processed by the function LAUT of the module SLLD which then executes step S41. In step S41, the module SLLD transmits to the element SE a request message containing the unique identifier APID of the application APP, and an identifier AID of an application SEAP targeted in the element SE, as well as possibly the public key APPK of the application APP which may be sent with the associated certificate APCT. This request message is received in step S42 by the module SLLS of the element SE. In step S42, the module SLLS performs the following verifications:

whether the identifier APID is peered with the element SE, possibly, the validity of the certificate APCT and its correspondence with the certificate contained in the table APL, whether the application SEAP corresponding to the identifier AID is installed in the element SE, and finally whether the application corresponding to the identifier APID in the list ACL is authorized to transmit commands to the application SEAP corresponding to the identifier AID.

If one of these verifications fails, steps S43 to S52 are not executed. Otherwise, the module SLLS starts a mutual authentication procedure with the module SLLD (steps S43 to S51).

In step S43, the module SLLS sends, in response, a message containing a random variable SER, and possibly a public key SEPK and an associated certificate SECT. Upon receiving this response message, the module SLLD executes steps S44 and S45. In step S44, the module SLLD performs the following operations:

possible verification of the certificate SECT by ensuring that it is still valid and that it corresponds to a previously supplied certificate, calculation of a signature IC of the executable code of the application APP, by the module INTC, by storing the start SCS and end SCE times of this calculation, generation of a session signature ICKS by applying a cryptographic function F1 to the signature IC and possibly to the start SCS and end SCE time values, generation of a random variable APR, calculation of a signature APS by applying a cryptographic function F2 to the private key APSK of the application APP, to the random variables SER and APR and to the signature ICKS.

In step S45, the module SLLD transmits to the element SE an authentication request Auth. containing the following data: the random variable APR, the signature APS and if any, the values of the start and end times SCS, SCE of signature IC calculation of the code of the application APP, used in step S44. Upon receiving the authentication request, the element SE executes step S46. In step S46, the element SE checks the signature APS by using the public key APPK of the application and the random variables SER and APR. The following steps S47 to S52 are executed only if the signature APS is correct. In step S47, the module SLLD performs the following operations:

reading, in the table APL, the stored signature IIC of the executable code of the application APP (supplied by the server SRV), and calculating a session signature ICKS' by applying the function F1 to the signature IIC, and if any, to the start and end times SCS, SCE of the signature IC calculation, received in step S45.

In step S48, the element SE compares the signature ICKS received with the signature ICKS' calculated in step S47, and compares the duration of the signature IC calculation (gap between the times SCS and SCE received in step S44) with the gap between previously stored values. If the signatures ICKS and ICKS' do not match, or if the duration of the calculation of the signature IC is too different from the duration of a previous signature IC calculation, the following steps S49 to S52 are not executed. In step S49, the element SE performs the following operations:

generation of a shared secret datum SK by applying a cryptographic function F3 to the public key SEPK of the element, and to the public key APPK of the application APP (supplied when customizing the application APP in step S21), generation of a secret session key SSK by applying a cryptographic function F4 to the datum SK and to the random variables SER and APR, and calculation of a signature SES by applying the cryptographic function F2 to the private key SESK of the element SE, to the random variables SER and APR, and to the signature ICKS' (=ICKS).

In step S50, the element SE transmits the obtained signature SES to the module SLLD. In step S51, the module SLLD checks the received signature SES using the public key SEPK and the signature ICKS calculated in step S44. The next step S52 is executed only if the signature SES is correct. In step S52, the module SLLD performs the calculations used to determine the keys SK and SSK using the functions F3 and F4 and the data SEPK, APPK, SER and APR (cf. step S49). The module SLLD then reports to the application APP that a session is activated by possibly supplying a session identifier to be used by the application APP to access the application SEAP in the element SE.

The session thus activated has put in place a secure transmission link LSL (FIG. 2) between the module SLLD of the application APP and the element SE. The transmission link LSL is used by the module SLLD to transmit application commands intended for an application SEAP in the element SE, issued by the application APP installed in the device MPU, and to transmit, in return, the responses to these commands sent by the application SEAP. Several sessions can thus be activated to enable different applications installed in the device MPU to communicate with an application SEAP in the element SE, each session being associated with a respective session key SSK.

Figure 5:
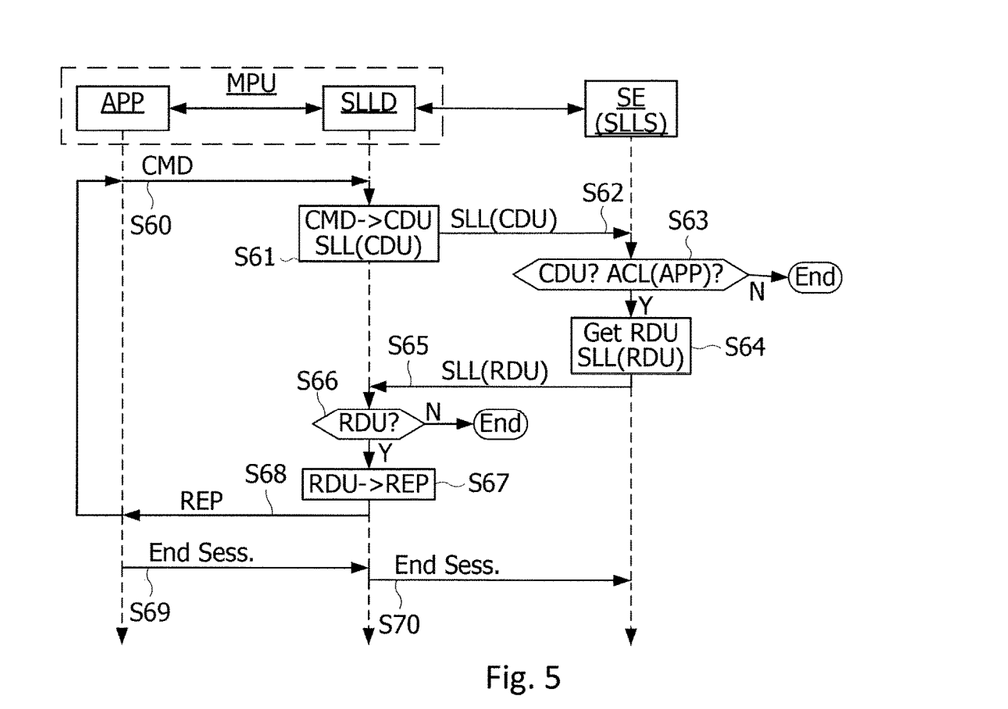

FIG. 5 represents steps S60 to S70 of a procedure for processing a command issued by the application APP requiring a secure link according to the list ACL stored by the element SE. The smooth conduct of this procedure requires that a session be previously activated upon request from the application APP, i.e. when a link LSL has been opened for the application APP. In step S60, a command CMD sent by the application APP is transmitted to the module SLLD of the application. In step S61, the module SLLD receives this command, translates it into a command CDU that can be understood by the element SE, such as an APDU command (Application Protocol Data Unit according to the ISO 7816 standard).

The translated command CDU is encapsulated using the session key SSK that it shares with the element SE. In the next step S62, the module SLLD transmits the encapsulated command SLL (CDU) to the element SE. This encapsulated command is received by the element SE in step S63. The element SE then performs the following operations:

extraction from the command CDU of the encapsulated command SLL (CDU) using the session key SSK, and verification, using the table ACL, that the element SE is authorized to execute the command CDU, according to the command, to the application APP corresponding to the identifier APID used when establishing the link LSL, and to the destination application SEAP of the command, as mentioned by the identifier contained in the command CDU.

It shall be noted that if the command has not been encapsulated with the session key SSK used by the element SE, it cannot be correctly extracted and will thus not correspond to a command authorized for an application SEAP installed in the element SE.

If according to the list ACL, the command CDU is authorized for the application APP and for the application SEAP targeted in the command, the element SE executes steps S64 to S66. In step S64, the element SE performs the following operations:

execution of the command CDU and retrieval of a response RDU to the command, and encapsulation of the response RDU using the session key SSK.

In step S65, the element SE transmits the encapsulated response SLL (REP) to the application APP. In step S66, the module SLLD of the application APP receives the encapsulated response and extracts the response RDU therefrom using the session key SSK. In step S66, if the response RDU thus obtained does not correspond to a possible value, the next steps S67 and S68 are not executed. If the response CDU has a possible value, it can be translated, if necessary, into a response message REP (step S67). The response message REP obtained is then sent to the application APP in step S68. The module SLLD is then ready to receive a new command from the application APP. The application APP can then send a new command or end the session by sending a command for this purpose to the module SLLD (step S69). The end-session command is transmitted again by the module SLLD to the element SE in step S70.

If in step S63, the command CDU is not authorized for the application identified in the command, or if in step S48, the element SE rejects the validity of the signature ICKS or of the duration SCE-SCS, the element SE can take any appropriate measure. Thus, the element SE may simply send a rejection message rejecting the command, to the module SLLD (in step S63). The module SLLD then reports this rejection to the application APP, and waits for a new command. The element SE can also end the session (step S63), by sending a message for this purpose to the module SLLD and/or by refusing any new command for the same session, it then being necessary for a new session to be activated by executing steps S40 to S52. The element SE may also refuse to open any session with the application APP corresponding to the identifier APID, or directly ask the server SRV to load a new customized application (new executable code, identifier APID, pairs of public and private keys APSK, APPK, certificate APCT and signature of the executable code IC) in the device MPU, to replace the application APP. In this case, steps S18 to S25 must be executed again. The database IDB will then be updated with the new data of the application APP. A counter can be used to number each command CDU sent via a channel LSL. The use of a channel can then be limited to the transmission of a certain number of commands. It can also be provided for the server SRV to trigger the reload, for example periodically, of a new customized application (new code, identifier, pairs of public and private keys and certificate) in the device MPU, for each application installed by triggering the execution of steps S18 to S25.

Figure 6:
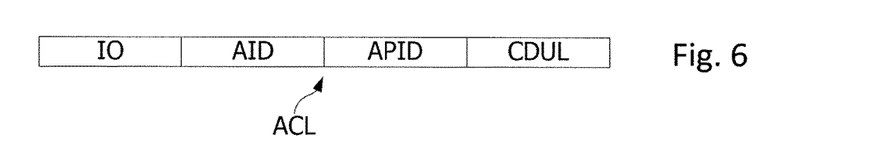
FIG. 6 represents the structure of an access control list used by the system.

FIG. 6 represents one example of structure of the list ACL. On FIG. 6, the access control list ACL may comprise several lines each comprising an identifier AID of application SEAP installed in the element SE, an identifier APID of an application APP installed in the device MPU, and a list CDUL of authorized and/or non-authorized commands CDU. Each line of the list ACL may also comprise a communication interface identifier (ISO 7816, RF, SWP) if the element SE comprises several. If no application APP identifier is specified in the field APID, any application APP can communicate with the application SEAP mentioned in the field AID, without establishing any secure link LSL, and thus without any mutual authentication. If a command is intended for an application SEAP not contained in the list ACL, the module SLLS transmits the command CDU to the application SEAP without performing any filtering. If a command is intended for an application SEAP contained in the list ACL, the module SLLS transmits the command to the application SEAP only if the list ACL comprises a line containing the identifier AID of the application SEAP, a field APID having a value equal to "ALL" or to the identifier APID of the application APP issuing the command, and a field CDUL equal to "ALL" or containing or not excluding the command CDU. An example of list ACL is given in Appendix I.

Figure 7:
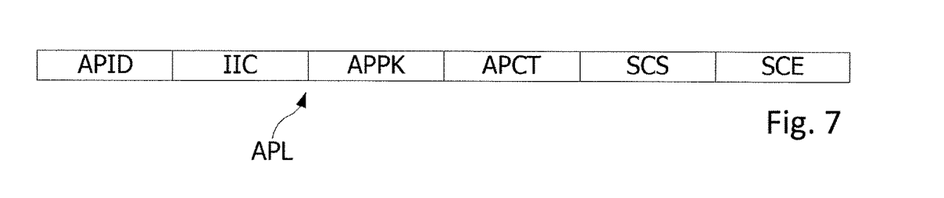
FIG. 7 represents the structure of a list of application data installed in the system, FIG. 8 schematically represents a sequence of steps according to another embodiment.

FIG. 7 represents an example of a structure of the table APL. On FIG. 7, the table APL comprises for each application APP installed in the device MPU and susceptible of communicating with the element SE, the identifier APID of the application, the signature IC of its code, its public key APPK, the certificate APCT of the public key, and the start and end times received from the application during a previous session or supplied by the server SRV if no session has yet been established.

Figure 8:
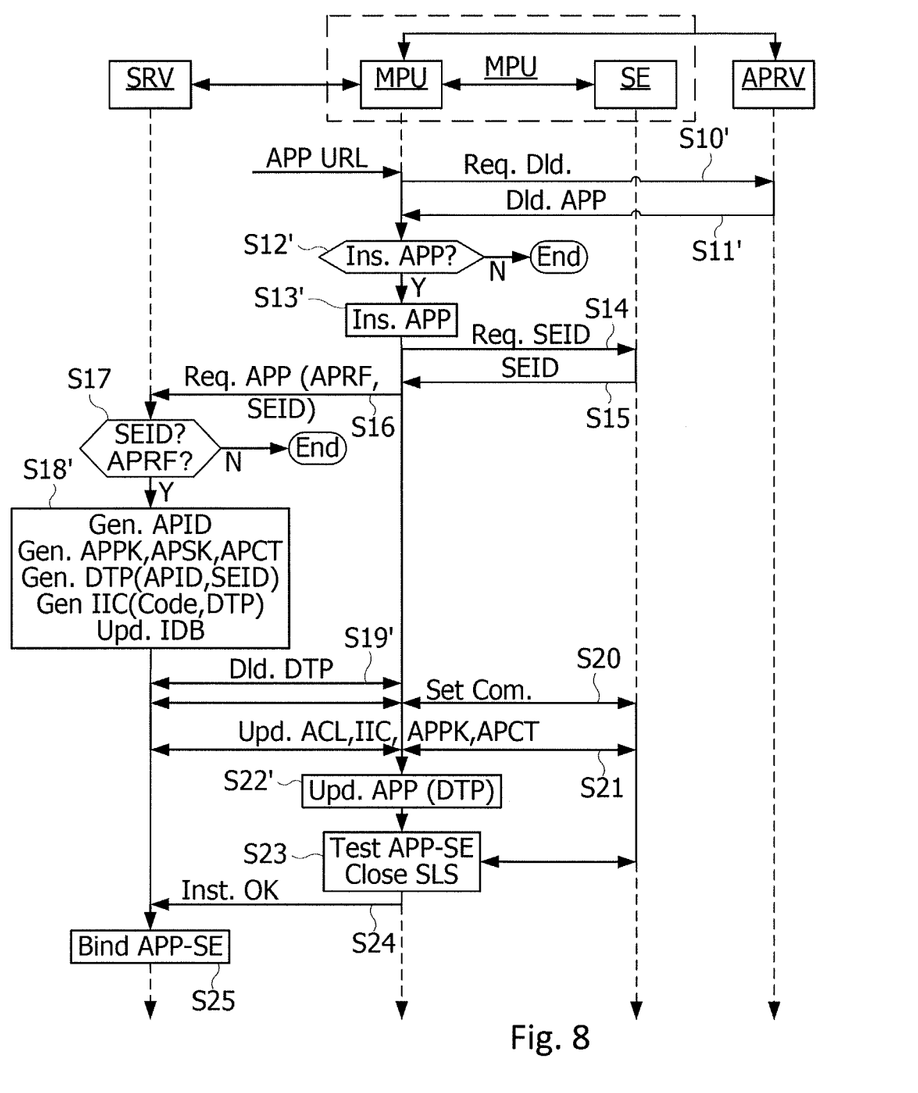

FIG. 8 represents an alternative to the sequence of steps in FIG. 3 in which only steps S10 to S13, S18, S19 and S22 have been modified and replaced with steps S10' to S13', S18', S19' and S22'. In this sequence of steps, the authentication data for authenticating the module SLLD of the application is supplied by the server SRV to the application APP which then has a generic form, i.e. non-customized, once the latter is installed in the device MPU. Such authentication data can then be generated again by the server SRV if needed. In steps S10' and S11', the requested generic application APP is directly downloaded by the device MPU from the server APRV. In steps S12' and S13', the downloaded application APP is only installed if the user so authorizes. Step S18' differs from step S18 in that a data set DTP is constituted by gathering therein the data used in step S18 to render the application APP specific, i.e. in particular, the unique identifiers of the application APID and of the secure element SEID, and the keys APSK, APPK, and the certificate APCT. The signature of the application's code IIC is calculated based on the code of the generic application and on the set DTP. In step S19', the data set DTP is transmitted to the device MPU, and in step S22', the application APP is updated with the data set DTP. The sequence of steps in FIG. 8 enables a simple update of the application APP to be performed instead of reinstalling the application APP (FIG. 3) every time a new customized application must be installed in the device MPU. As above, steps S18' to S25 are executed every time the application APP must be updated.

An attack of the element SE can involve retrieving a still active session key SSK and using it to access the secure link LSL, and thus communicate with the element SE. However, the scope of this attack is limited to the commands authorized in the list ACL. This attack can be at least partly countered by avoiding storing the session key SSK in the device MPU, and thus by recalculating it using the function F4 (execution of step S52) every time it must be used by the module SLLD of the application APP (in steps S61 and S66).

Another attack can involve retrieving the certificate APCT, and the public APPK and private APSK keys of the application APP to generate another session. However, to generate a session, it may be necessary to have the signature IC of the executable code of the application APP installed in the device MPU, as stored by the element SE and the server SRV. In this respect, it shall be noted that this signature is not stored by the device MPU or transmitted in clear by the latter. It is thus necessary to be capable of calculating it and therefore to have the signature calculation module INTC for calculating the signature of the application APP, or to know the algorithm on which this calculation is based. The risk of this algorithm being discovered can be reduced by periodically reinstalling the application APP in the device MPU (execution of steps S18 or S18' to S25), and possibly by loading this algorithm or a secret datum used by this algorithm in each new application APP.

It shall be noted that an attack may concern only one system associating a given device MPU and a given element SE, due to the fact that the application APP is specific to each system MPU-SE.

It will be understood by those skilled in the art that the present invention is susceptible of various alternative embodiments and various applications. In particular, the invention is not limited to the use of a signature of the executable code of the application APP to enable the element SE to authenticate this application. Indeed, in one admittedly less robust alternative, this signature may only concern a portion of the executable code of the application, for example only the module SLLD, or only one datum or several data varying from one instance of the customized application APP to another, like the certificate CT or the public APPK or private APSK key.

The module SLLD in each application APP installed in the device MPU can be replaced with a specific application configured to establish secured links LSL with the element SE for the other applications installed in the element MPU, and being the sole authorized to establish such secured links. In this way, it may not be necessary to have to customize each application APP. In this case, the specific application can be reinstalled several times, in particular every time an error is encountered when the specific application executes for an application APP, verification steps shown in particular in FIGS. 4 and 5.

Furthermore, the list ACL is optional, all the commands then being authorized for all the applications installed in the element SE provided that a secure link LSL has been established between an application APP and the element SE and that the command is sent via the link LSL. In addition, the list ACL can define each command authorized for each application SEAP installed in the element SE, or merely each authorized command irrespective of the application SEAP.

APPENDIX I being an integral part of the description

| No. | I/O | AID | APID | CDUL | Comment |
|---|---|---|---|---|---|
| 1 | IO1 | AID1 | APID1 | APDUm, APDUn | The application APID1 can only ask the applet AID1 to execute the commands APDUm and APDUn via the interface IO1 |
| 2 | IO1 | AID1 | APID2 | ALL | The application APID2 can ask the applet AID1 to execute any command via the interface IO1 |
| 3 | IO1 | AID1 | APID3 | *APDUm, *APDUn | The application APID3 can ask the applet AID1 to execute any command except APDUm and APDUn via the interface IO1 |
| 4 | IO2 | AID2 | NONE | / | No application is authorized to access the applet AID2 via the interface IO2 |
| 5 | IO3 | AID3 | ALL | ALL | Any application can ask the applet AID3 to execute any command via the interface IO3 |
| 6 | IO3 | AID4 | ALL | APDUm, APDUn | Any application can access the applet AID4 via the interface IO3, but only the commands APDUm and APDUn are authorized |
| 7 | IO3 | AID5 | ALL | *APDUm, *APDUn | Any application can access the applet AID4 via the interface IO3, but the commands APDUm and APDUn are prohibited |

The invention claimed is:

1. A method for executing, by a secure element of a mobile terminal, a command sent by a non-secure processor of the mobile terminal, the method comprising:
   receiving and installing, in the non-secure processor:
      a customized application module configured to manage communications between the non-secure processor and the secure element; and
      an application that is distinct from the customized application module;
   securely receiving, by the secure element, first authentication data for authenticating the customized application module, the first authentication data including a first signature of executable code of the customized application module;
   using the customized application module, generating and transmitting, from the non-secure processor to the secure element, second authentication data for authenticating the customized application module, the second authentication data including a second signature of the executable code of the customized application module;

determining, by the secure element, whether the first authentication data and the second authentication data are consistent with each other;

in the event the secure element determines that the first authentication data and the second authentication data are consistent with each other, establishing, using at least one of the first authentication data and the second authentication data, a secure communication link between the customized application module and the secure element;

transmitting, by the application, the command from the non-secure processor to the secure element;

determining, by the secure element, whether the command is received via the secure communication link; and in the event the command is received via the secure communication link, executing the command.

2. The method of claim 1, further comprising:

calculating, by the customized application module, the second authentication data by applying a cryptographic function to the second signature.

3. The method of claim 1, further comprising:

determining, by the secure element based on an access control list included in the secure element, if the command is authorized for a destination application installed in the secure element, and/or authorized for an issuing application issuing the command, the issuing application being installed in the non-secure processor; and executing, by the secure processor, the command only if the command is determined to be authorized.

4. The method of claim 1, wherein each application installed in the non-secure processor that is capable of communicating with the secure element includes an instance of the customized application module.

5. The method of claim 1, further comprising:

transmitting and installing, in the non-secure processor, a new customized module for managing communications with the secure element, or new data for customizing the customized application module; and transmitting, to the secure element, new first authentication data for authenticating the new customized application module or the customized application module associated with the new customization data.

6. The method of claim 1, further comprising:

generating, by a trusted server, the customized application module;

establishing, using an address of the trusted server, a secure link between the trusted server and the secure element; and transmitting, by the trusted server to the secure element via the secure link, the first authentication data for authenticating the customized application module.

7. The method of claim 6, wherein the address of the trusted server is provided to the secure element during a process of customizing the secure element, the process of customizing being performed based on identification data for identifying a user.

8. The method of claim 6, wherein transmitting the first authentication data between the trusted server and the secure element is preceded by mutual authentication steps between the trusted server and the secure element.

9. The method of claim 1, wherein a secure communication link is established between the non-secure processor and the secure element exclusively for a single application installed in the non-secure processor, while another secure communication link is established between the non-secure processor and the secure element for another application installed in the non-secure processor.

10. The method of claim 1, wherein the secure communication link is established between the non-secure processor and the secure element for a limited duration of time or to transmit a limited number of commands.

11. A terminal comprising:

a non-secure processor;

communication circuits to communicate with a remote trusted server; and a secure element connected to the non-secure processor, the terminal being configured to:

receive and install, in the non-secure processor:

a customized application module configured to manage communications between the non-secure processor and the secure element; and an application that is distinct from the customized application module;

securely receive, by the secure element, first authentication data for authenticating the customized application module, the first authentication data including a first signature of executable code of the customized application module;

using the customized application module, generate and transmit, from the non-secure processor to the secure element, second authentication data for authenticating the customized application module, the second authentication data including a second signature of the executable code of the customized application module;

determine, by the secure element, whether the first authentication data and the second authentication data are consistent with each other;

in the event the secure element determines that the first authentication data and the second authentication data are consistent with each other, establish, using at least one of the first authentication data and the second authentication data, a secure communication link between the customized application module and the secure element;

transmit, by the application, a command from the non-secure processor to the secure element;

determine, by the secure element, whether the command is received via the secure communication link; and in the event the command is received via the secure communication link, execute the command.

12. The terminal of claim 11, wherein the secure element is a secure processor or a secure environment implemented in a processor.

13. A secure element comprising a connection interface to a non-secure processor in a mobile terminal, the secure element being configured to:

securely receive, from a trusted server, first authentication data for authenticating a customized application module installed in the non-secure processor, the first authentication data including a first signature of executable code of the customized application module;

receive, from the non-secure processor, second authentication data for authenticating the customized application module, the second authentication data including a second signature of the executable code of the customized application module;

determine whether the first authentication data and the second authentication data are consistent with each other;

establish, based on the first authentication data or the second authentication data, a secure communication link with the customized application module;

receive a command supplied by an application installed in the non-secure processor;

determine if the command was sent via the secure communication link; and if the command was sent via the secure communication link, execute the command.

14. The secure element of claim 13, wherein the secure element is further configured to:

execute the command only if it is authorized, based on an access control list stored in the secure element, for a destination application of the command, the destination application being installed in the secure element, and/or authorized, based on the access control list, for an application issuing the command, the application issuing the command being installed in the non-secure processor.

15. The secure element of claim 13, the secure element being further configured to:

issue a command for installing a new customized application module for managing communications in the non-secure processor connected to the secure element; and receive, in case of error encountered when establishing the secure communication link or when processing a received command, new first authentication data for authenticating the new customized application module.

16. The secure element of claim 13, the secure element being further configured to receive, following a mutual authentication with the trusted server, the first authentication data for authenticating the customized application module sent from the trusted server via a secure link established the trusted server using an address of the trusted server.

17. The secure element according to claim 16, the secure element being further configured to keep the secure communication link with the customized application module and the secure link with the trusted server active during a limited duration of time.

18. The terminal of claim 11, wherein the non-secure processor is configured, by the customized application module to, calculate a second signature of the executable code of the customized application module, and to calculate the first authentication data by applying a cryptographic function to the second signature.

19. The terminal of claim 11, wherein the secure element is configured to:

store an access control list; and execute the command only if the command is authorized, according to the access control list, for a destination application installed in the secure element, and/or authorized for an issuing application issuing the command, the issuing application being installed in the non-secure processor.

20. The terminal of claim 11, wherein each application installed in the non-secure processor that is capable of communicating with the secure element includes an instance of the customized application module.

21. The terminal of claim 11, wherein the non-secure processor is configured to:

receive a new customized application module to be installed in the non-secure processor, or new data for customizing the customized application module installed in the non-secure processor, either periodically or in case of error encountered by the secure element when establishing the secure communication link, or when processing a command issued by the application installed in the non-secure processor; and transmit, to the secure element, new first authentication data for authenticating the new customized application module or the customized application module associated with the new customization data.

22. The terminal of claim 11, wherein the secure element is configured to:

establish, using an address of the remote trusted server, a secure link with the remote trusted server; and receive, via the secure link, the first authentication data for authenticating the customized application module.

23. The terminal of claim 22, wherein the address of the remote trusted server is provided to the secure element during a process of customizing the secure element, the process of customizing being performed based on identification data for identifying a user.

24. The terminal of claim 22, wherein the secure element is configured to perform mutual authentication steps with the remote trusted server.

25. The terminal of claim 11, wherein the secure communication link is established between the non-secure processor and the secure element exclusively for a single application installed in the non-secure processor, while another secure communication link is established between the non-secure processor and the secure element for another application installed in the non-secure processor.

26. The terminal of claim 11, wherein the secure communication link is established between the non-secure processor and the secure element for a limited duration of time, or to transmit a limited number of commands.

* * * * *